(12) United States Patent
Hutchison et al.

(10) Patent No.: US 9,285,391 B2
(45) Date of Patent: Mar. 15, 2016

(54) OPTOMECHANICAL INERTIAL SENSOR (71) Applicant: Intel Corporation, Santa Clara, CA (US)

(72) Inventors: David N. Hutchison, Santa Clara, CA (US); John Heck, Berkeley, CA (US)

(73) Assignee: INTEL CORPORATION, Santa Clara, CA (US)

( * ) Notice: Subject to any disclaimer, the term of this patent is extended or adjusted under 35 U.S.C. 154(b) by 25 days.

(21) Appl. No.: 14/106,259

(22) Filed: Dec. 13, 2013

(65) Prior Publication Data

US 2015/0168442 A1 Jun. 18, 2015

(51) Int. Cl.
G01B 9/02 (2006.01)
G01P 15/093 (2006.01)
G01C 19/56 (2012.01)
G01P 15/08 (2006.01)

(52) U.S. Cl.
CPC .......... *G01P 15/093* (2013.01); *G01B 9/02023* (2013.01); *G01C 19/56* (2013.01); *G01P 2015/0848* (2013.01)

(58) Field of Classification Search
CPC .......... G01P 15/093; G01P 2015/0848; G01B 9/02023
See application file for complete search history.

(56) References Cited

U.S. PATENT DOCUMENTS

| | | | |
|---|---|---|---|
| 4,529,876 A * | 7/1985 | Walker | 250/227.19 |
| 4,900,918 A * | 2/1990 | Killian | 73/514.27 |
| 5,367,584 A | 11/1994 | Ghezzo et al. | |
| 5,926,591 A | 7/1999 | Labeye et al. | |
| 6,856,712 B2 | 2/2005 | Fauver et al. | |
| 2002/0180978 A1 * | 12/2002 | Berg et al. | 356/477 |

(Continued)

FOREIGN PATENT DOCUMENTS

| | | |
|---|---|---|
| CN | 1743850 A | 3/2006 |
| CN | 101960252 A | 1/2011 |

(Continued)

OTHER PUBLICATIONS

I. De Vlaminck et al., "Detection of nanomechanical motion by evanescent light wave coupling" Applied Physics Letters 90, 233116, 2007, 3 pages.

(Continued)

*Primary Examiner* — Michael A Lyons
*Assistant Examiner* — Shawn Decenzo
(74) *Attorney, Agent, or Firm* — Schwabe Williamson & Wyatt PC (57) ABSTRACT Embodiments of the present disclosure are directed towards techniques and configurations for MEMS sensing device configured to determine inertial change applied to the device. In one instance, the device may comprise a laser arrangement configured to generate a light beam, and a waveguide configured to split the light beam into two portions. The waveguide may include two arms through which the respective portions of the light beam may respectively pass, and disposed substantially parallel with each other and joined together around their respective ends to recombine the portions into a light beam. One of the arms may be deformable. A deformation of the arm may result in a change of an optical path length of a portion of the light beam traveling through the arm, causing a detectable change in light intensity of the recombined light beam outputted by the waveguide. Other embodiments may be described and/or claimed.

18 Claims, 7 Drawing Sheets

(56) References Cited

U.S. PATENT DOCUMENTS

| | | |
|---|---|---|
| 2003/0200803 A1 | 10/2003 | Platt |
| 2003/0206693 A1 | 11/2003 | Tapalian et al. |
| 2004/0156580 A1 | 8/2004 | Baumann et al. |
| 2005/0025419 A1 | 2/2005 | Fish et al. |
| 2005/0160816 A1 | 7/2005 | Yu |
| 2005/0268717 A1 | 12/2005 | Ozawa |
| 2006/0072875 A1 | 4/2006 | Bhagavatula et al. |
| 2006/0169044 A1 | 8/2006 | Hodgins et al. |
| 2006/0192974 A1 | 8/2006 | Li |
| 2006/0198567 A1 | 9/2006 | Levy et al. |
| 2006/0279862 A1 | 12/2006 | Elata et al. |
| 2010/0238454 A1 | 9/2010 | Pruessner et al. |
| 2010/0290060 A1 | 11/2010 | Mohazzab et al. |
| 2011/0179870 A1* | 7/2011 | Chan et al. ................ 73/514.32 |
| 2011/0303008 A1* | 12/2011 | Zhang et al. ............... 73/514.26 |
| 2013/0027710 A1* | 1/2013 | Parks et al. ................... 356/450 |
| 2013/0330232 A1 | 12/2013 | Pruessner et al. |
| 2014/0283601 A1 | 9/2014 | Bhave et al. |

FOREIGN PATENT DOCUMENTS

| | | |
|---|---|---|
| EP | 1083429 A2 | 3/2001 |
| GB | 2493585 A | 2/2013 |
| JP | 2002250885 A | 9/2002 |
| JP | 2006064977 A | 3/2006 |
| KR | 1020030080637 A | 10/2003 |
| TW | I265277 B | 11/2006 |
| WO | 2013052953 A1 | 4/2013 |

OTHER PUBLICATIONS

Eric Ollier, "Optical MEMS Devices Based on Moving Waveguides", IEEE Journal on Selected Topics in Quantum Electronics, Vol. 8, No. 1, Jan./Feb. 2002, 8 pages.

Marcel W. Pruessner et al., "End-Coupled Optical Waveguide MEMS Devices in the Indium Phosphide Material System", J. Micromech. Microeng. 16, pp. 832-842, 2006, 11 pages.

Kirill Zinoviev et al., "A Novel Optical Waveguide Microcantilever Sensor for the Detection of Nanomechanical Forces", Journal of Lightwave Technology, Vol. 24, No. 5, May 2006, 7 pages.

M. Li et al.,"Broadband All-Photonic Transduction of Nanocantilevers", Nat.Nanotechnol.4,377, 2009, 3 pages.

G. Anetsberger et al., "Near-Field Cavity Optomechanics with Nanomechanical Oscillators", Nature Physics, vol. 5, pp. 909-914, Dec. 2009, 6 pages.

Mounier et al., "Status of the MEMS Industry" Yole Développement, Jul. 2012, 3 pages.

T.J. Kippenberg et al., "Cavity Opto—Mechanics", Optical Society of America, 2007, 34 pages.

D.N. Hutchison et al., "Z-Axis Optomechanical Accelerometer", IEEE pp. 615-619, 2012, 5 pages.

A. G. Krause et al., "A high-resolution microchip optomechanical accelerometer," Nature Photonics 6, pp. 768-772, 2012, 2 pages.

B. E. Little et al., "Microring resonator channel dropping filters," Lightwave Technology Journal of, vol. 15, No. 6, pp. 998-1005, 1997, 9 pages.

International Search Report for PCT Application No. PCT/US2014/066702, dated Mar. 6, 2015, 14 pages.

International Search Report for PCT Application No. PCT/US2014/066464, dated Feb. 26, 2015, 14 pages.

International Search Report for PCT Application No. PCT/US2014/066463, dated Mar. 6, 2015, 13 pages.

International Search Report for PCT Application No. PCT/US2014/066462, dated Mar. 17, 2015, 13 pages.

Taiwan Office Action for TW Application No. 103138911, dated Jul. 6, 2015, 14 pages.

Taiwan Office Action for TW Application No. 103139067, dated Jul. 21, 2015, 14 pages.

Taiwan Office Action for TW Application No. 103139069, dated Jul. 21, 2015, 16 pages.

Non-Final Office Action mailed Sep. 25, 2015, issued in related U.S. Appl. No. 14/106,172, filed Dec. 13, 2013, 29 pages.

Office Action and Search Report mailed Oct. 2, 2015, in corresponding Taiwan Patent Application No. 103139210, 16 pages.

Hutchison, D.N., et al., "Z-Axis Optomechanical Accelerometer," IEEE, MEMS 2012, Paris, France, Jan. 29- Feb. 2, 2012, pp. 615-619.

\* cited by examiner

OPTOMECHANICAL INERTIAL SENSOR

FIELD

Embodiments of the present disclosure generally relate to the field of opto-electronics, and more particularly, to using micro-electronic systems (MEMS) for accelerometry or gyroscopy.

BACKGROUND

The market demands and revenues for displacement-sensing devices, such as accelerometers including micro-electronic systems (MEMS)-based sensors have been growing steadily. The integration of inertial MEMS sensors into a wide range of consumer electronics, cars, and defense applications is driving the need for smaller, cheaper, lower-power, lower-noise, and more accurate sensors. Technologies for producing micro-scale accelerometers and similar sensing devices have remained essentially unchanged since their inception years ago. A typical sensor in an accelerometer may include a movable proof-mass with the proof-mass displacement sensed electrically, e.g., using inter-digitated capacitor plates. However, traditional electrostatic sensing may not allow for scalable production of on-chip sensors, lasers, and detectors, and may not provide sufficient sensitivity or desired sensitivity range.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure describe techniques and configurations for providing an example MEMS sensing device 100 for sensing inertial change. In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

In various embodiments, the phrase "a first layer formed, deposited, or otherwise disposed on a second layer," may mean that the first layer is formed, deposited, or disposed over the second layer, and at least a part of the first layer may be in direct contact (e.g., direct physical and/or electrical contact) or indirect contact (e.g., having one or more other layers between the first layer and the second layer) with at least a part of the second layer.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
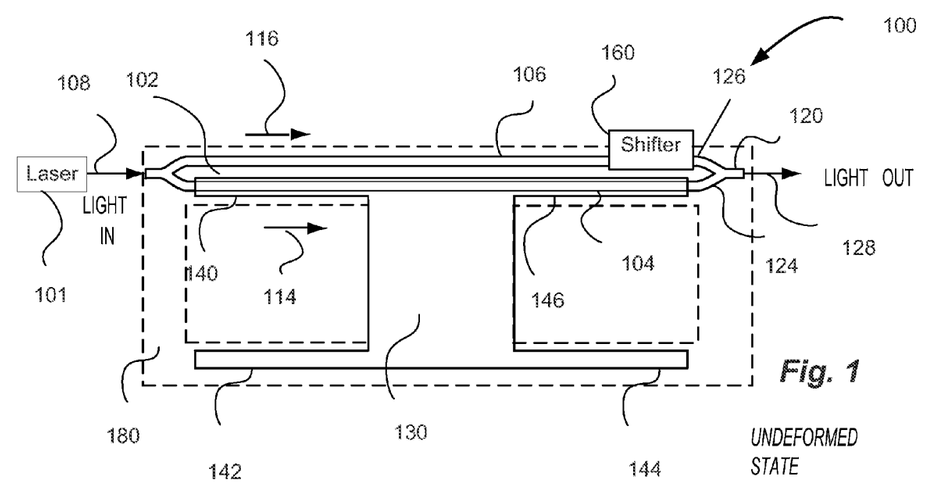
FIGS. 1 and 2 are diagrams schematically illustrating an example MEMS sensing device for sensing inertial change, in accordance with some embodiments.
Figure 2:
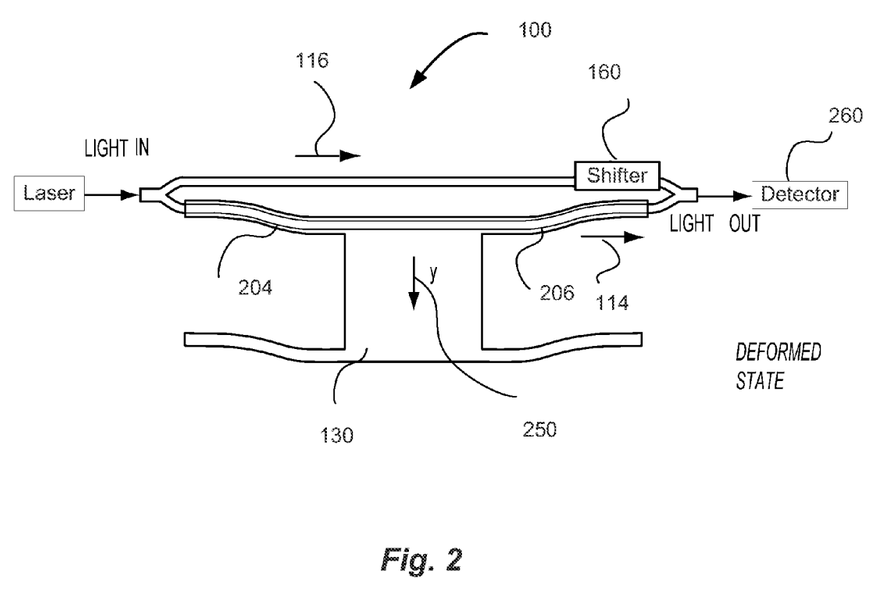

FIGS. 1 and 2 are diagrams schematically illustrating an example MEMS sensing device 100 for sensing inertial change, in accordance with some embodiments. In some embodiments, the sensing device 100 may comprise a Mach-Zehnder interferometer (MZI). The device 100 may include a waveguide 102 configured to split into a first arm 104 and a second arm 106. An light beam 108 inputted from a light source 101 (e.g., laser arrangement) may be split into a first portion 114 and second portion 116, which pass through the first and second arms 104 and 106 respectively. In some embodiments, the first and second arms 104 and 106 may be disposed substantially parallel with each other and rejoined together at an output 120 around their respective ends 124 and 126 to recombine the first and second portions 114 and 116 into a recombined light beam 128. In some embodiments, one of the arms 104 and 106, e.g., first arm 104 may be deformable, such as stretchable and/or compressible.

A deformation of a deformable arm, such as the first arm 104 may result in a change of an optical path length of a portion 114 of the light beam 108 traveling through the arm, causing a detectable change in light intensity of the recombined light beam 128 outputted by the waveguide 102. FIG. 2 illustrates the device 100 with the arm 104 in a deformed state, as indicated by curves 204, 206 of the arm 104 that resulted from the deformation of the arm 104. For simplicity purposes, some of the device 100 components are indicated by corresponding numerals only in FIG. 1.

In some embodiments, the deformation of the deformable arm 104 may be caused mechanically. For example, the device 100 may further include a proof mass 130 attached to the first arm 104, as shown in FIGS. 1 and 2. The proof mass may include one or more deformable spring arrangements, such as legs 140, 142, 144, and 146. The proof mass and spring arrangements may be formed using, for example, the underlying silicon (Si) wafer. In some embodiments, the proof mass 130 may be attached to the first arm 104 with the legs 140 and 146, while the legs 142 and 144 may be affixed at their respective ends to a frame 180 (shown in FIG. 1 in a dashed line for simplicity). In some embodiments, the proof mass 130 may be movably affixed to the frame 180 such that the proof mass 130 may be movable at least in one direction relative to the frame 180. For example, the proof mass 130 may be configured to move in a substantially perpendicular direction (y-direction) relative to the waveguide 102 as indicated by an arrow 250 in FIG. 2, by virtue of having deformable legs, two of which are (e.g., 142 and 144) affixed to the frame 180 at their ends as described above.

An external acceleration applied to the frame 180 may cause the movement of the proof mass 130, which in turn may cause a deformation of the first arm 104. As illustrated in FIG. 1, with no acceleration, the first arm 104 runs along the underlying proof mass deformable legs 140 and 146. With applied acceleration in the y direction 250, the first arm 104 may be deformed, e.g., flexed as shown in FIG. 2, resulting in a longer optical path length for the light portion 114, and a different phase offset (and corresponding change in light power output, or light intensity) at the output of the light 128, which may be detected by a detector 260. It is to be understood that the term "acceleration" may refer to a linear acceleration (for accelerometry), or a Coriolis acceleration (meaning, the apparent acceleration measured in the reference frame of the device due to an applied rotation rate, which may be used for gyroscopy).

In some embodiments, the first arm 104 may have different shapes, e.g., not necessarily substantially straight as shown in FIG. 1. The first arm 104 may run along the deformable legs 140 and 146 substantially corresponding to the legs shape. The legs may have one or more bends with sufficient radius of curvature around the bends so to not induce significant optical losses in the waveguide 102.

In summary, the deformation of the first arm 104 may be caused by a movement of the proof mass 130 in response to the inertial change associated with the acceleration applied to the frame 180 in the direction 250, as illustrated in FIG. 2. The corresponding change of light intensity of the light 128 may be detectable. An inertial change (e.g., acceleration) applied to the frame 180 to which the device 100 may be affixed may be determined based on the detected change in light intensity.

In some embodiments, the device 100 may include a phase shifter 160 coupled with the second arm 106 and configured to provide a phase shift to the second portion 116 of the light beam 108 relative to the first portion 114 of the light beam 108. The phase shifter 160 may be configured to tune (e.g., calibrate) the phase in the second arm 106 relative to the first arm 104, in order to counter potential fabrication imperfections and temperature drift associated with the device 100. In other embodiments, the phase tuning may be accomplished by using the arms 104 and 106 of determined lengths corresponding to a desired phase shift between the light portions 114 and 116.

Figure 3:
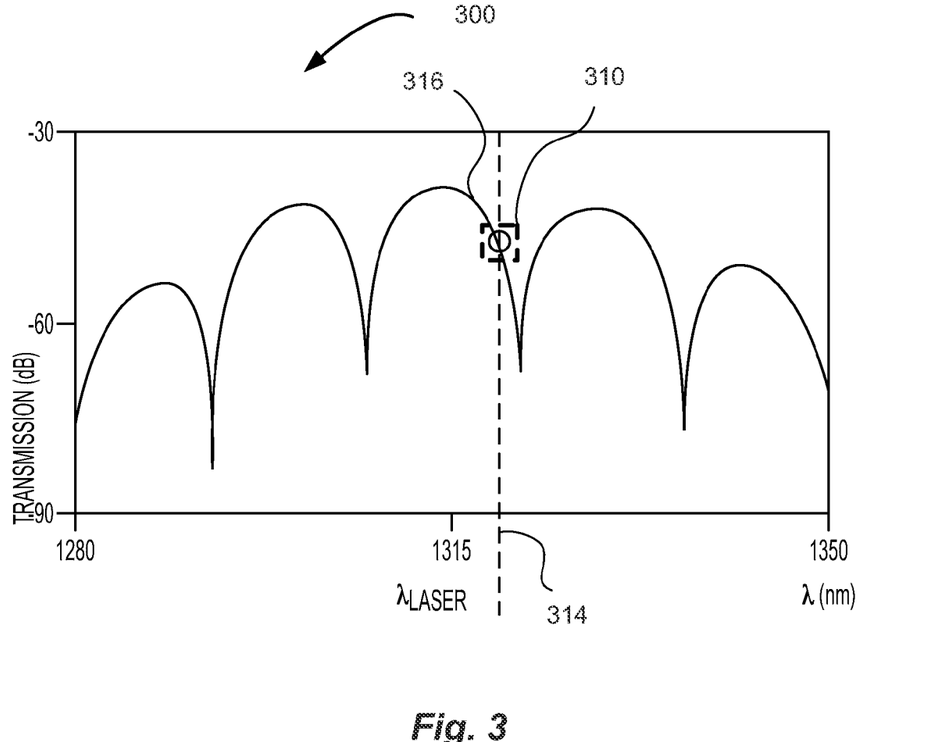
FIG. 3 is an example graph illustrating a light signal power output as a function of light signal wavelength of the sensing device of FIGS. 1 and 2, in accordance with some embodiments.
Figure 4:
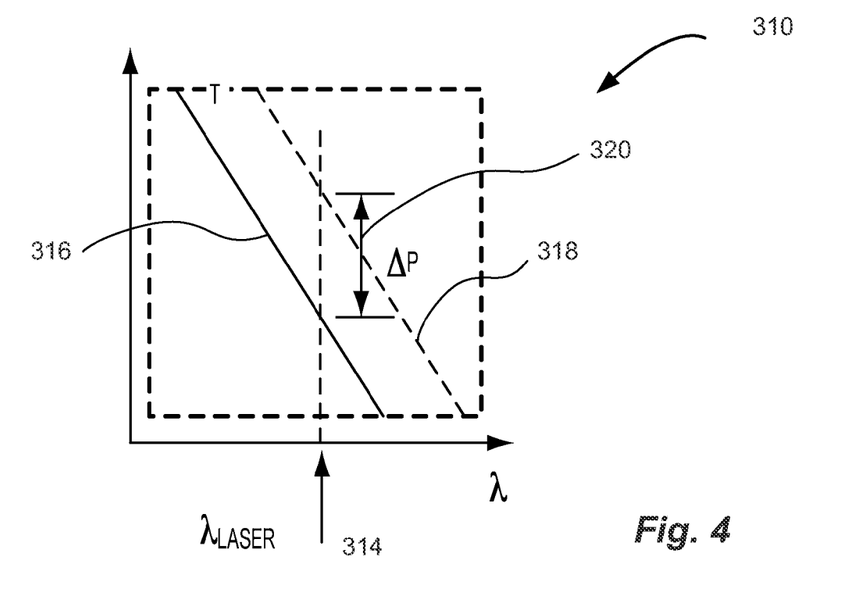
FIG. 4 is an enlarged view of a portion of the graph of FIG. 3 indicated by a dashed line, in accordance with some embodiments.

FIG. 3 is an example graph 300 illustrating a light signal power (spectrum) output as a function of light signal wavelength of the sensing device 100, in accordance with some embodiments. FIG. 4 is an enlarged view of a portion 310 of the graph 300 indicated by a dashed line. The light signal power corresponds to light intensity and will be used hereinafter interchangeably with light intensity. As graphs 300 and 310 illustrate, upon deformation of one of the arms (e.g., arm 104), the curve 316 may shift to a position 318. If the input light wavelength $\lambda_{laser}$ 314 is fixed at a point which may be at the point of a steepest slope of the curve 316, the optical power of the light signal transmitted by the waveguide 102 may change by ΔP at the output, as indicated by numeral 320 in FIG. 4. This change in output optical power (light intensity) may be detectable, and the external acceleration applied to the device 100 may be determined based on the detected change in the output optical power (light intensity).

It is important to note that the sensitivity (e.g., the smallest measurable signal, or the smallest measurable change in signal) and dynamic range (e.g., the largest measurable signal before saturation or failure) may be decoupled in the device 100. Traditional electrostatic MEMS sensing device may typically require a trade-off between sensitivity and dynamic range. In the device 100, the dynamic range may be dictated by the linear region of the curve in the vicinity of $\lambda_{laser}$ 314, which is indeed coupled to the sensitivity. However, if the device 100 is operated in a feedback mode, where shifts in the curve 316 in FIG. 3 are tracked and compensated for, e.g., using an electrooptic/thermooptic phase-shifter in one of the arms (such as shifter 160), the need to remain in the linear region of the curve 316 may be overcome. In this case, the dynamic range of the sensing device 100 may be dictated by the properties of the mechanical spring arrangements (legs) 140, 142, 144, 146, which dictate how far the proof mass 130 may travel in a straight motion relative to the frame 180, and sensitivity and dynamic range of the device 100 may be decoupled.

We now return to further discussion of the operating principle of the sensing device 100. There may be different ways of deformation of the spring arrangements 140, 142, 144, 146 that may cause corresponding changes in optical path length along the arm 104, such as, for example, stress-optical effects due to bending the arm 104, and optical path length change (e.g., optical path lengthening) due to stretching the arm 104 longitudinally. A full stress-optical derivation (not given here for simplicity) may show that the stress-optical effects may be insignificant and are not considered herein.

Consider optical path change due to stretching the arm 104 longitudinally. An analytical derivation (not given here for simplicity) may provide a relationship between a phase difference at the output 120 between the light portions 114 and 116 and an external acceleration causing the phase difference in the device 100. For a simplified approach, assume the spring arrangements 140, 142, 144, 146 do not deform in an S-shape, but simply make a straight line from their respective start points to the end points. This may provide give a "worst-case" result, as an S-shape may always be longer than the corresponding straight line from a start point to end point of the spring arrangement. Such a simplification may allow for finding the change in phase at the output (e.g., phase in one arm minus phase in the other arm) as follows:

$$\Delta\phi = \frac{2\pi n_{\mathit{eff}}}{\lambda}\Delta L \approx \frac{2\pi n_{\mathit{eff}}}{\lambda}2\left(\sqrt{L_f^2 + x^2} - L_f\right) \approx \frac{2\pi n_{\mathit{eff}}}{\lambda}\frac{x^2}{L_f} \quad \text{Equation 1}$$

where n eff is the effective index of the waveguide, $\lambda$ is the wavelength of the laser, $L_f$ is the length of one of the flexures, $\Delta L$ is the path length difference due to displacement of the proof mass, and x is a measure of how far the proof mass has moved due to acceleration in the direction perpendicular to the waveguide. For example, for $n_{\mathit{eff}}=3$ and $\lambda=1.31$ microns, the results are provided in the table below.

TABLE 1

| $L_f$ (μm) | x-deflection needed for pi/2 phase shift (μm) |
|---|---|
| 100 | 3.3 |
| 200 | 4.6 |
| 300 | 5.7 |

As table 1 illustrates, the proof mass may move within a range of about 3 μm for a 100 μm long flexure of the spring arrangements in order to get a complete on-to-off extinction. On-to-off extinction may mean that the light output may go from its maximum value, when the light in the two paths constructively interferes, to its minimum value, when the light in the two arms destructively interferes, or vice-versa. Typically, the movements of the proof mass may be smaller because smaller changes than a full on-to-off extinction may be detectable (which may be a difference of 20 dB or more), and in at least the basic mode of operation of the sensing device 100 it may be desirable to stay within a linear region of the device's transmission spectrum to simplify signal processing, as described in reference to FIGS. 3-4.

The sensing device 100 described above in reference to FIGS. 1-2 may be utilized in various embodiments described below, for example, in accelerometer or gyroscope sensing. In the accelerometer application, the proof mass displacement may be measured and the acceleration may be deduced from $$a = \omega_m^2 y', \quad \text{Equation 2}$$

where $\omega$ is the mechanical resonant frequency.

Figure 5:
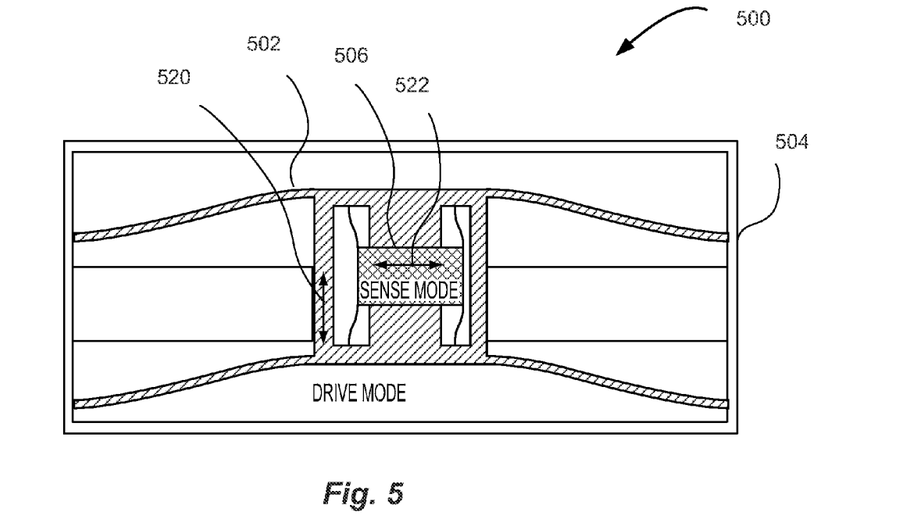
FIGS. 5-9 schematically illustrate various examples of a MEMS sensing device in different applications, in accordance with some embodiments.
Figure 6:
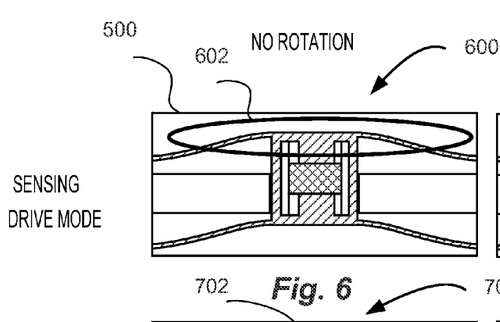
Figure 7:
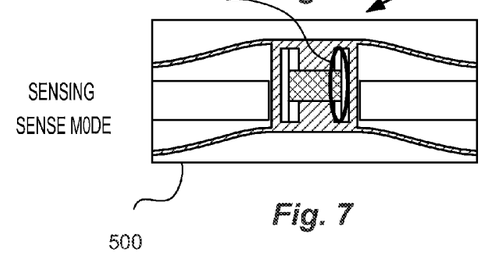
Figure 8:
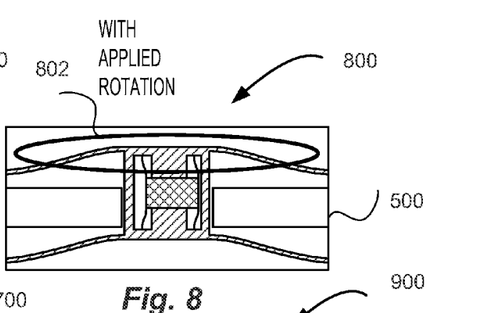
Figure 9:
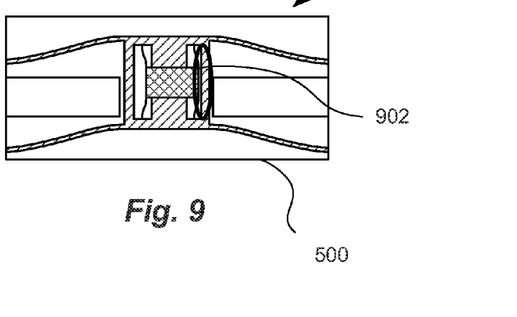

The gyroscope application is described in more detail in reference to FIGS. 5-9. FIG. 5 is an example configuration of a MEMS sensing device 500 such as a gyroscope, in accordance with some embodiments. The sensing device 500 may include an outer proof mass 502 affixed to a fixed frame 504. The proof mass 502 may be configured similar to one described in reference to FIGS. 1-2 and accordingly may include a sensing device similar to one described in reference to FIGS. 1-2 (not shown in FIG. 5 for simplicity). The proof mass 502 may be configured to move in the direction indicated by arrow 520 (drive mode).

The device 500 may further include an inner proof mass 506 (also configured similar to one described in reference to FIGS. 1-2 and including a similar sensing device that is not shown for simplicity) that is free to move in the direction indicated by arrow 522 (sense mode), e.g., perpendicular to the drive mode. In some embodiments, the inner proof mass 506 may be disposed within the outer proof mass 502. In other embodiments, the inner and outer proof masses 506 and 502 may be disposed separately and affixed to the frame 504. The outer proof mass 502 may be excited at a determined drive frequency "ω drive," e.g., using a "drive" set of comb fingers (not shown for clarity), in order to provide for the Coriolis force (calculated to determine rotation speed) to be measurable.

FIGS. 6-9 illustrate an example MEMS sensing device 500 in different modes pertaining to a gyroscope, specifically, configured to measure the gyroscope's sense and drive modes with or without applied external rotation, e.g., gyroscopes 600, 700, 800, and 900 configured as described in reference to FIG. 5. More specifically, device 500 may be configured to sense the drive mode and sense mode without or with applied external rotation. For example, device 500 may sense the drive mode and sense mode without applied external rotation in states 600 and 700 respectively and may sense the drive mode and sense mode with applied external rotation in states 800 and 900 respectively. An outer proof mass 502 may be driven in the y-direction at frequency w using electrostatic or other techniques, and when the gyroscope is subject to rotation about the z-axis to external rotation (the z-axis vector being in the direction out of plane of the page, so the rotation of the device occurring in plane with the page), an inner proof mass 506 may deform in the x-direction at frequency $\omega_{sense}=\omega_{drive}$. The device 500 may be configured to detect the motion of either the sense mode or the drive mode in states 600, 700, 800, and 900 at the locations of the black ellipses indicated by numerals 602, 702, 802, and 902 respectively. Note that the drive mode motion may also be sensed separately if desired.

Figure 10:
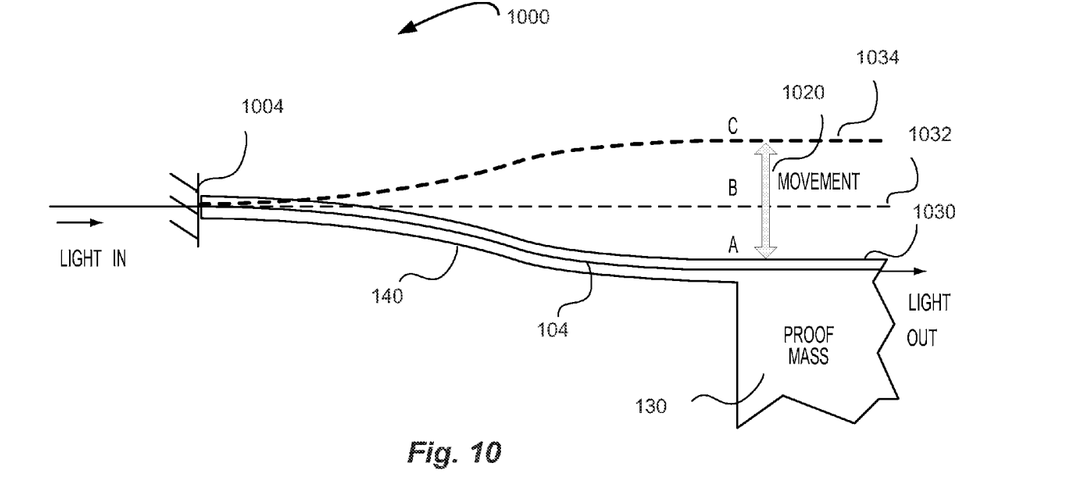
FIGS. 10-11 schematically illustrate enlarged views of a portion of an example MEMS sensing device in accordance with some embodiments.

Returning to the discussion of operation of the sensing device 100, note that the device 100, at least in the embodiments described in reference to FIGS. 1-2, may not be able to distinguish accelerations in the +y direction from those in the −y direction. FIG. 10 illustrates an enlarged view 1000 of a portion of an example sensing device 100 in accordance with some embodiments. For simplicity purposes, the like components of the device 100 are indicated by the like numerals according to an example device 100 illustrated in FIG. 1. The view 1000 includes one of spring arrangements (legs) 140 of the sensing device 100 attached to a fixed frame (not shown) at a clamping point 1004. The leg 140 is coupled to a proof mass 130 (a part of which is shown for simplicity). The arm 104 of the waveguide 102 as described in FIG. 1 is shown as running along the spring arrangement (leg) 140.

As described above, the leg 140 may deform (e.g., flex) in response to an external acceleration applied to the device 100. The flexure of the leg 140 is illustrated by three exemplary positions corresponding to the movement of the proof mass 130 in a direction upward or downward, as indicated by arrow 1020. Specifically, in position A (1030), the proof mass 130 may be deflected downwards; in position B (1032), the proof mass 130 may rest in equilibrium; and in position C (1034), the proof mass 130 may be deflected upwards. Accordingly, the leg 140 may be bent downwards in position A, may remain without deformation in position B, and may be bent upwards in position C. As evident from FIG. 10, the optical path length change of the arm 104 between positions B and A (downward), and between positions B and C (upward) may remain substantially the same. Accordingly, it may not be possible to distinguish positive accelerations from negative accelerations applied to the embodiments of the device 100 as described in reference to FIGS. 1-2 and 10.

Figure 11:
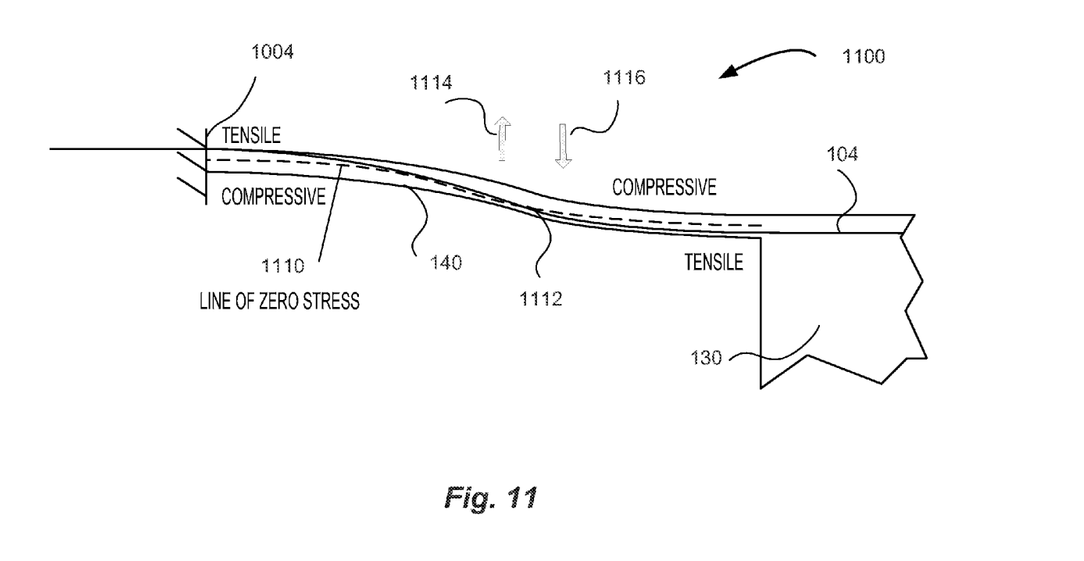

FIG. 11 illustrates an enlarged view 1100 of a portion of an example sensing device 1000 that is modified relative to the example device 100 of FIG. 10, in accordance with some embodiments. More specifically, the spring arrangement (leg) 140 under acceleration may comprise a tensile/compressive profile as shown in FIG. 11, with a line of zero stress 1110 (dashed line) running approximately along the center of the leg 140. The arm 104 of the waveguide 102 may be modified to comprise a pre-formed "S" shape along the leg 140, as shown in FIG. 11. For example, the arm 104 of the waveguide may be configured to run above the line of zero stress 1110, e.g., closer to the top of the leg 140 in an area proximate the attachment point of the leg 140 to the clamping point 1004. The arm 104 may be further configured to run below the line of zero stress 1110, e.g., closer to the bottom of the leg 140 in a direction away from the clamping point 1004 and toward the proof mass 130. For example, the arm 104 may be configured to cross the line of zero stress 1110 at a point 1112, e.g., approximately at half-length of the leg 140, as shown in FIG. 11.

With the arm 104 configured as described above, small deformations of the arm 104 in one direction may shorten the optical path length of the arm 104, and small deformations of the arm 104 in the other direction may lengthen the optical path length of the arm 104. Thus, a change of the optical path length (shortening versus lengthening) may correspond to a direction of the deformation of the leg 140 (upward 1114 or downward 1116), which may be determined accordingly. In the example of FIG. 11, the proof mass may be moved downward to a position A (described in reference to FIG. 10). The leg 140 may be bent downwards 1116, and the arm 104 may run along the tensile stressed parts of the leg 140, with corresponding lengthening of the optical path.

Figure 12:
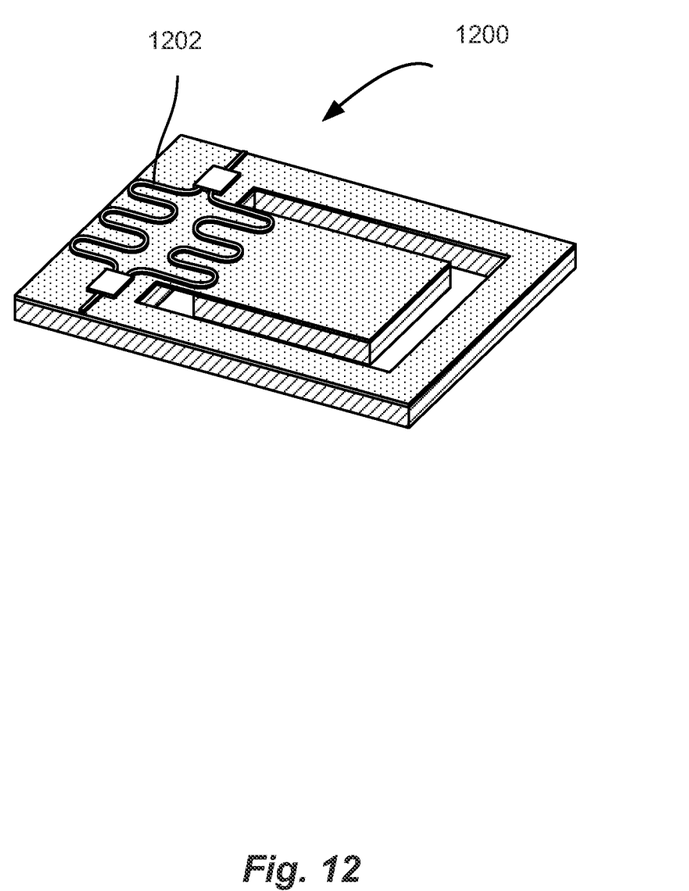
FIG. 12 schematically illustrates an example sensing device comprising a variation of the device of FIG. 1, in accordance with some embodiments.

FIG. 12 illustrates an example sensing device 1200 comprising a variation of the device 100, where a waveguide 1202 may have a multi-bent shape as shown in FIG. 12. As discussed above, the arms of the waveguide may run along the deformable legs substantially corresponding to the legs shape. The legs may have one or more bends with sufficient radius of curvature around the bends so to not induce significant optical losses in the waveguide 1202. In the embodiment in FIG. 12, the waveguide may include bends that run along a flat spring arrangement, allowing for sensing of out-of-plane accelerations. In another embodiment, the device may be substantially more like device 100, but with a serpentine or otherwise bent waveguide running over a serpentine or otherwise bent spring arrangement, for sensing in-plane accelerations. This embodiment may allow for larger displacements for the same acceleration when compared with the straight-waveguide embodiment of device 100. Also note that if a temperature measuring device were to be integrated on the same chip with the device 600 or 700, a heater or electro-optic device integrated into the optical resonator 602 (702) may be configured to counter any drift of the resonant frequency due to changes in environmental temperature.

Figure 13:
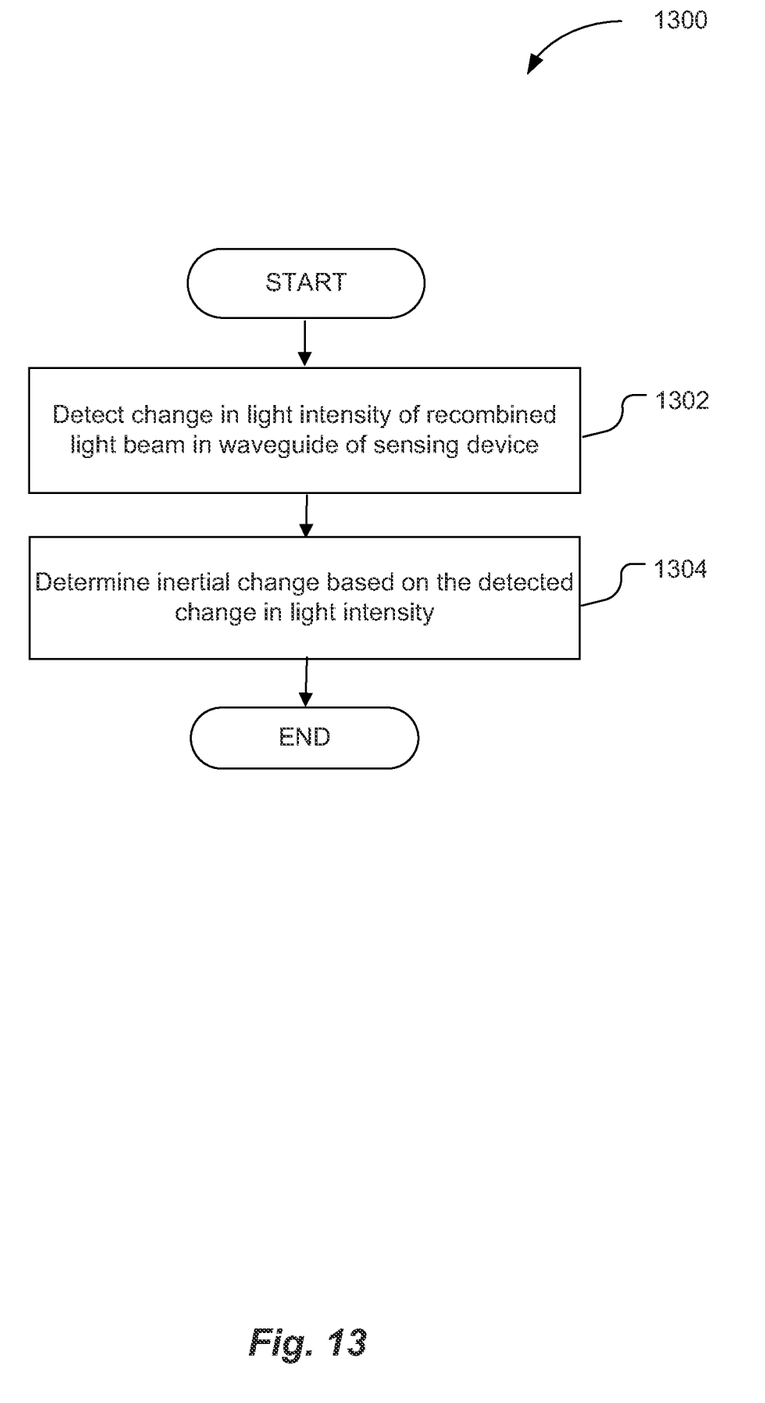
FIG. 13 schematically illustrates a flow diagram for a method of operating a MEMS sensing device, in accordance with some embodiments.

FIG. 13 is a process flow diagram illustrating operation of MEMS sensing device similar to device 100 described in reference to FIGS. 1-2, in accordance with some embodiments. The process 1300 may begin at block 1302, where a change in light intensity of a recombined light beam outputted by a waveguide of the sensing device may be detected.

As described above, the device may include the waveguide comprising a first arm configured to pass through a first portion of a light beam inputted in the waveguide and a second arm configured to pass through a second portion of the light beam. The first and second arms may be disposed substantially parallel each other and joined together around respective ends of each arm to recombine the first and second portions into the recombined light beam. In some embodiments, the first arm may be configured to be deformable and the deformation of the arm may cause a corresponding change in the light intensity, which may be detected at block 1302.

At block 1304, an inertial change (e.g., an external acceleration) applied to the sensing device may be determined, based on the detected light intensity change, as described above. For example, the optical power of the transmitted light signal may vary with acceleration. The acceleration may be calculated based on that dependency.

Figure 14:
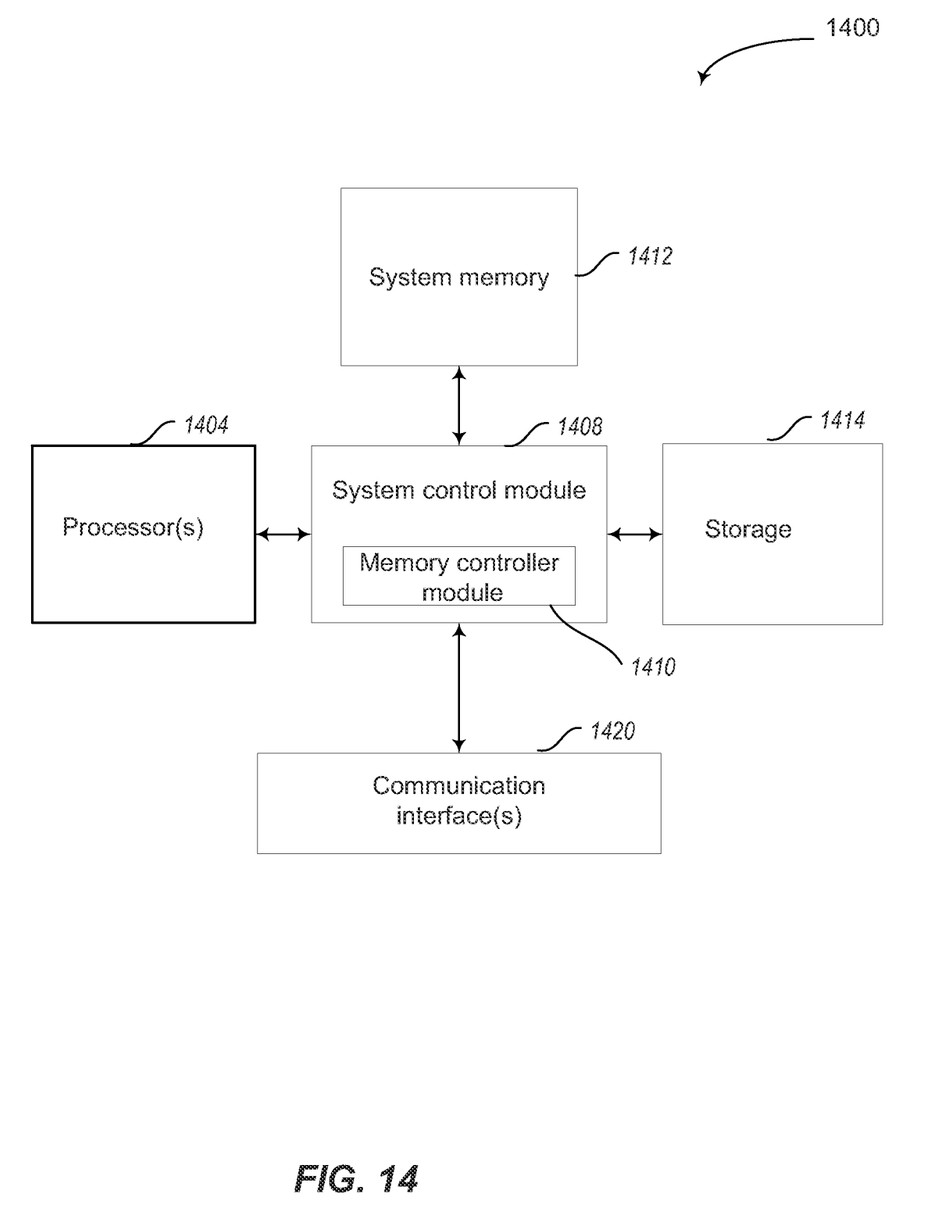
FIG. 14 schematically illustrates an example computing device including a MEMS sensing device, in accordance with some embodiments.

FIG. 14 schematically illustrates an example system that may be used to practice various embodiments described herein. FIG. 14 illustrates, for one embodiment, an example system 1400 having one or more processor(s) 1404, system control module 1408 coupled to at least one of the processor(s) 1404, system memory 1412 coupled to system control module 1408, non-volatile memory (NVM)/storage 1414 coupled to system control module 1408, and one or more communications interface(s) 1420 coupled to system control module 1408.

In some embodiments, the system 1400 may include a sensing device similar to ones described in reference to FIGS. 1-12 and provide logic/module that performs functions aimed at detecting change of light intensity and calculating external acceleration and/or rotation applied to the system and/or other modules described herein. For example, the sensing device may be disposed in a chip included in the system 1400. In some embodiments, the system 1400 may include one or more computer-readable media (e.g., system memory or NVM/storage 1414) having instructions and one or more processors (e.g., processor(s) 1404) coupled with the one or more computer-readable media and configured to execute the instructions to implement a module to perform light intensity change detection and inertial change calculation actions described herein.

System control module 1408 for one embodiment may include any suitable interface controllers to provide for any suitable interface to at least one of the processor(s) 1404 and/or to any suitable device or component in communication with system control module 1408.

System control module 1408 may include memory controller module 1410 to provide an interface to system memory 1412. The memory controller module 1410 may be a hardware module, a software module, and/or a firmware module. System memory 1412 may be used to load and store data and/or instructions, for example, for system 1400. System memory 1412 for one embodiment may include any suitable volatile memory, such as suitable DRAM, for example. System control module 1408 for one embodiment may include one or more input/output (I/O) controller(s) to provide an interface to NVM/storage 1414 and communications interface(s) 1420.

The NVM/storage 1414 may be used to store data and/or instructions, for example. NVM/storage 1414 may include any suitable non-volatile memory, such as flash memory, for example, and/or may include any suitable non-volatile storage device(s), such as one or more hard disk drive(s)

(HDD(s)), one or more compact disc (CD) drive(s), and/or one or more digital versatile disc (DVD) drive(s), for example. The NVM/storage 1414 may include a storage resource physically part of a device on which the system 1400 is installed or it may be accessible by, but not necessarily a part of, the device. For example, the NVM/storage 1414 may be accessed over a network via the communications interface(s) 1420.

Communications interface(s) 1420 may provide an interface for system 1400 to communicate over one or more network(s) and/or with any other suitable device. The system 1400 may wirelessly communicate with the one or more components of the wireless network in accordance with any of one or more wireless network standards and/or protocols.

For one embodiment, at least one of the processor(s) 1404 may be packaged together with logic for one or more controller(s) of system control module 1408, e.g., memory controller module 1410. For one embodiment, at least one of the processor(s) 1404 may be packaged together with logic for one or more controllers of system control module 1408 to form a System in Package (SiP). For one embodiment, at least one of the processor(s) 1404 may be integrated on the same die with logic for one or more controller(s) of system control module 1408. For one embodiment, at least one of the processor(s) 1404 may be integrated on the same die with logic for one or more controller(s) of system control module 1408 to form a System on Chip (SoC).

In various embodiments, the system 1400 may have more or less components, and/or different architectures. For example, in some embodiments, the system 1400 may include one or more of a camera, a keyboard, liquid crystal display (LCD) screen (including touch screen displays), non-volatile memory port, multiple antennas, graphics chip, application-specific integrated circuit (ASIC), and speakers.

In various implementations, the system 1400 may be, but is not limited to, a mobile computing device (e.g., a laptop computing device, a handheld computing device, a tablet, a netbook, etc.), a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the system 1400 may be any other electronic device.

The embodiments described herein may be further illustrated by the following examples. Example 1 is a microelectromechanical system (MEMS) apparatus, comprising: a laser arrangement configured to generate a light beam; and a waveguide configured to split the light beam into a first and second portions, the waveguide including a first arm and a second arm through which the first and second portions of the light beam are to respectively pass, the first and second arms disposed substantially parallel with each other and joined together around respective ends of each arm to recombine the first and second portions into a recombined light beam, wherein the first arm is configured to be deformable, wherein a deformation of the first arm results in a change of an optical path length of a portion of the light beam traveling through the first arm, causing a detectable change in light intensity of the recombined light beam outputted by the waveguide.

Example 2 may include the subject matter of Example 1, and further specifies that the apparatus further comprises a phase shifter coupled with the second arm and configured to provide a phase shift to the second portion of the light beam relative to the first portion of the light beam.

Example 3 may include the subject matter of Example 1, and further specifies that the apparatus further comprises a detector coupled to the waveguide and configured to detect the change in light intensity of the light beam outputted by the waveguide.

Example 4 may include the subject matter of Example 3, and further specifies that the apparatus further comprises circuitry coupled to the detector to determine an inertial change associated with the apparatus based on the detected change in light intensity.

Example 5 may include the subject matter of Example 4, and further specifies that the apparatus further comprises a first proof mass attached to the first arm, wherein the deformation of the first arm is caused by a movement of the first proof mass in response to the inertial change associated with the apparatus.

Example 6 may include the subject matter of Example 5, and further specifies that the first proof mass is configured to move in a substantially perpendicular direction relative to the waveguide.

Example 7 may include the subject matter of Example 6, and further specifies that the apparatus further comprises a frame, wherein the first proof mass is movably affixed to the frame such that the first proof mass is movable at least in one direction relative to the frame, wherein an external acceleration of the frame causes the inertial change that causes movement of the first proof mass.

Example 8 may include the subject matter of Example 7, and further specifies that the apparatus comprises a first assembly, wherein the apparatus further includes a second assembly comprising: another waveguide configured to further split the light beam into a third and fourth portions, the waveguide including a third arm and a fourth arm through which the third and fourth portions of the light beam are to respectively pass, the third and fourth arms disposed substantially parallel with each other and joined together around respective ends of each arm to recombine the third and fourth portions into another recombined light beam, wherein the third arm is configured to be deformable; wherein a deformation of the third arm results in a change of an optical path length of a portion of the light beam traveling through the third arm, causing a detectable change in light intensity of the recombined light beam outputted by the waveguide.

Example 9 may include the subject matter of Example 8, and further specifies that the apparatus further comprises a second proof mass attached to the third arm, wherein the deformation of the third arm is caused by a movement of the proof mass in response to an external rotation applied to the apparatus.

Example 10 may include the subject matter of Example 9, and further specifies that the second proof mass is disposed on the first proof mass.

Example 11 may include the subject matter of Example 10, and further specifies that the first proof mass is attached to the frame with a first spring arrangement, wherein the second proof mass is attached to the first proof mass with a second spring arrangement.

Example 12 may include the subject matter of Example 1, and further specifies that the first arm comprises a substantially S-shaped bend, wherein the deformation of the first arm in one direction comprises lengthening of the first arm, and the deformation of the first arm in an opposite direction comprises shortening of the first arm.

Example 13 may include the subject matter of any of Examples 1 to 12, and further specifies that the apparatus is integrated in a chip.

Example 14 may include the subject matter of Example 13, and further specifies that the chip is integrated in a computing device.

Example 15 is a method, comprising: detecting a change in light intensity of a recombined light beam outputted by a waveguide of a micro-electromechanical system (MEMS) apparatus including a waveguide comprising a first arm through which a first portion of a light beam inputted in the waveguide passes and a second arm through which a second portion of the light beam passes, the first and second arm disposed substantially parallel with each other and joined together around respective ends of each arm to recombine the first and second portions into the recombined light beam, wherein the first arm is configured to be deformable; and determining an inertial change associated with the apparatus based on the detected change in light intensity, wherein the detected change occurs in response to a deformation of the first arm.

Example 16 may include the subject matter of Example 15, and further specifies that the method further comprises: tuning a first wavelength of the first portion of the light beam relative to a second wavelength of the second portion of the light beam to provide the recombined light beam having a wavelength corresponding to a determined value of a sine curve formed by the recombined light beam before the detecting the change in light intensity of the recombined light beam.

Example 17 may include the subject matter of any of Examples 15 to 16, and further specifies that the first arm is attached to a proof mass, wherein the deformation of the first arm is caused by a movement of the first proof mass in response to the inertial change associated with the apparatus, wherein the inertial change is caused by an external acceleration of the apparatus.

Example 18 may include the subject matter of Example 17, and further specifies that the proof mass moves substantially perpendicular relative to the waveguide.

Example 19 may include the subject matter of Example 18, and further specifies that the first arm comprises an S-shaped bend, wherein the deformation of the first arm in one direction comprises lengthening of the first arm, and the deformation of the first arm in an opposite direction comprises shortening of the first arm, wherein the method further comprises: determining whether a length of the first arm increased or decreased; and identifying a direction of movement of the proof mass, based on a result of the determining.

Example 20 may include the subject matter of Example 19, and further specifies that the method further comprises: determining a direction of an external acceleration based on a result of identifying.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. A micro-electromechanical system (MEMS) apparatus, comprising:
    a laser arrangement to generate a light beam;
    a waveguide substantially disposed in a frame to split the light beam into a first and second portions, the waveguide including a first arm and a second arm through which the first and second portions of the light beam are to respectively pass, the first and second arms disposed substantially parallel with each other and joined together around respective ends of each arm to recombine the first and second portions into a recombined light beam, wherein the first arm is to be deformable; and
    a proof mass attached to the first arm independently from the second arm and movably affixed to the frame,
    wherein the proof mass is to move along a substantially straight line in a substantially perpendicular direction relative to the waveguide disposed in the frame and to the second portion of the light beam passing through the second arm, wherein the first arm is to deform in response to a movement of the first proof mass that occurs in response to inertial change associated with the apparatus, while the second arm remains free of deformation, wherein a deformation of the first arm results in a change of an optical path length of a portion of the light beam traveling through the first arm, causing a detectable change in light intensity of the recombined light beam outputted by the waveguide.

2. The apparatus of claim 1, further comprising a phase shifter coupled with the second arm and to provide a phase shift to the second portion of the light beam relative to the first portion of the light beam.

3. The apparatus of claim 1, further comprising a detector coupled to the waveguide to detect the change in light intensity of the light beam outputted by the waveguide.

4. The apparatus of claim 3, further comprising circuitry coupled to the detector to determine the inertial change associated with the apparatus based on the detected change in light intensity.

5. The apparatus of claim 4, wherein the proof mass attached to the first arm is a first proof mass; and wherein the first proof mass is to move in the substantially perpendicular direction relative to the waveguide.

6. The apparatus of claim 5, wherein the first proof mass is movable at least in one direction relative to the frame, wherein an external acceleration of the frame causes the inertial change that causes movement of the first proof mass.

7. The apparatus of claim 6, wherein the apparatus comprises a first assembly, wherein the apparatus further includes a second assembly comprising:
    another waveguide to further split the light beam into a third and fourth portions, the waveguide including a third arm and a fourth arm through which the third and fourth portions of the light beam are to respectively pass, the third and fourth arms disposed substantially parallel with each other and joined together around respective ends of each arm to recombine the third and fourth portions into another recombined light beam, wherein the third arm is to be deformable;

wherein a deformation of the third arm results in a change of an optical path length of a portion of the light beam traveling through the third arm, causing a detectable change in light intensity of the recombined light beam outputted by the waveguide.

8. The apparatus of claim 7, further comprising a second proof mass attached to the third arm, wherein the deformation of the third arm is caused by a movement of the proof mass in response to an external rotation applied to the apparatus.

9. The apparatus of claim 8, wherein the second proof mass is disposed on the first proof mass.

10. The apparatus of claim 9, wherein the first proof mass is attached to the frame with a first spring arrangement, wherein the second proof mass is attached to the first proof mass with a second spring arrangement.

11. The apparatus of claim 1, wherein the first arm comprises a substantially S-shaped bend, wherein the deformation of the first arm in one direction comprises lengthening of the first arm, and the deformation of the first arm in an opposite direction comprises shortening of the first arm.

12. The apparatus of claim 1, wherein the apparatus is integrated in a chip.

13. The apparatus of claim 12, wherein the chip is integrated in a computing device.

14. A method, comprising:
 detecting a change in light intensity of a recombined light beam outputted by a waveguide of a micro-electromechanical system (MEMS) apparatus, the waveguide substantially disposed in a frame and comprising a first arm through which a first portion of a light beam inputted in the waveguide passes and a second arm through which a second portion of the light beam passes, the first and second arm disposed substantially parallel with each other and joined together around respective ends of each arm to recombine the first and second portions into the recombined light beam, wherein the first arm is to be deformable; and
 determining an inertial change associated with the apparatus based on the detected change in light intensity, the detected change occurring in response to a deformation of the first arm caused by a movement of a proof mass attached to the first arm independently from the second arm, in response to inertial change associated with the apparatus, while the second arm remains free of deformation, the proof mass moving along a substantially straight line in a substantially perpendicular direction relative to the waveguide disposed in the frame and to the second portion of the light beam passing through the second arm.

15. The method of claim 14, further comprising: tuning a first wavelength of the first portion of the light beam relative to a second wavelength of the second portion of the light beam to provide the recombined light beam having a wavelength corresponding to a determined value of a sine curve formed by the recombined light beam before the detecting the change in light intensity of the recombined light beam.

16. The method of claim 14, wherein the inertial change is caused by an external acceleration of the apparatus.

17. The method of claim 16, wherein the first arm comprises an S-shaped bend, wherein the deformation of the first arm in one direction comprises lengthening of the first arm, and the deformation of the first arm in an opposite direction comprises shortening of the first arm, wherein the method further comprises:
 determining whether a length of the first arm increased or decreased; and
 identifying a direction of movement of the proof mass, based on a result of the determining.

18. The method of claim 17, further comprising:
 determining a direction of an external acceleration based on a result of identifying.

\* \* \* \* \*